THRESHOLD DETECTOR CIRCUIT WITH CROSS COUPLED TRANSISTOR PAIRS

Filed Jan. 14, 1966 2 Sheets-Sheet 1

INVENTOR
EUGENE N. SCHROEDER
BY David E. Lovejoy
AGENT 3,514,633
THRESHOLD DETECTOR CIRCUIT WITH CROSS COUPLED TRANSISTOR PAIRS

Eugene N. Schroeder, Bethesda, Md., assignor to International Business Machines Corporation, Armonk, N.Y., a corporation of New York Filed Jan. 14, 1966, Ser. No. 520,585
Int. Cl. H03k *5/20*
U.S. Cl. 307—235 2 Claims

ABSTRACT OF THE DISCLOSURE

A voltage level detector circuit is shown in which four transistors are arranged to be stable in either of two states such that the first and third transistors are on when the second and fourth transistors are off and vice versa. The voltage level applied to the bases of the first and second transistors with reference to the threshold level determines which pair of transistors will conduct. The emitter of the first transistor is cross-coupled to the collector of the fourth transistor and the emitter of the second transistor is cross-coupled to the collector of the third transistor to achieve a change in voltage across the emitter reference impedances in response to the current through the respective third and fourth transistors.

INTRODUCTION

Figure 1:
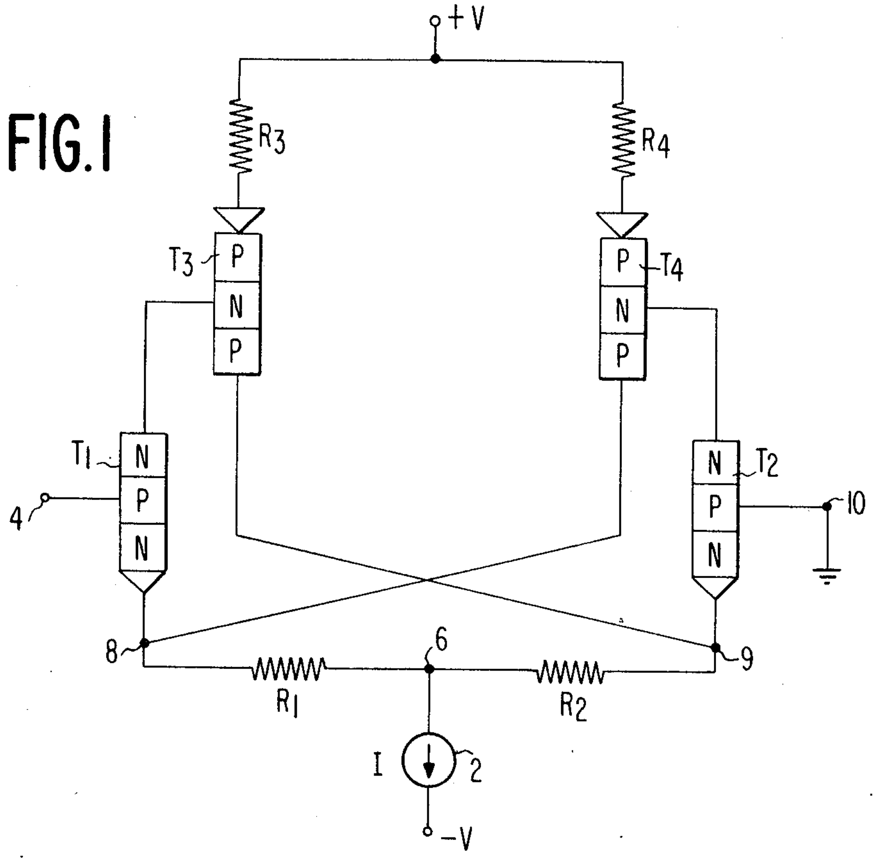

This invention relates to circuits for detecting when signals are above or below preselected voltage levels. Such circuits are commonly used, for example, as transmission line terminators for detecting signal levels in data transmission systems, as voltage threshold detector circuits in any environment, or as bistable circuits in digital apparatus.

PRIOR ART AND PROBLEMS

Although a number of similar prior art circuits are known, they have not been completely satisfactory due to a number of problems. For example, the Schmitt trigger type of circuit does not detect threshold levels with sufficient accuracy and repeatability especially where small threshold levels are involved. Other types of circuits such as dual-differential amplifiers are capable to some extent of accurately detecting low level threshold signals, but they are more expensive and require more components than circuits embodying the present invention.

OBJECTS

Accordingly, an object of this invention is to more economically and accurately detect threshold levels.

Another object of this invention is to detect and more economically reproduce symmetrical input signals.

A further object of this invention is to detect in an improved manner the transition of a signal above a first threshold level and its transition below a second threshold level.

An additional object of this invention is to more stably and more accurately detect relatively low voltage threshold levels.

A further additional object of this invention is to provide a more simple threshold detector circuit in which the threshold levels are independently and accurately adjustable.

SUMMARY OF INVENTION

The present invention contemplates a circuit arrangement of four transistors, or their equivalent gates and polarity detectors, arranged for detecting when an input signal voltage goes above a first threshold level and below a second threshold level. The accuracy and stability of the invention arises from the simple and economical novel connection of the elements. The four transistors are arranged to be stable in either of two states such that the first and third are *on* when the second and fourth are *off* and vice versa. The voltage levels applied to the bases of the first and second transistors with reference to the threshold levels determines which pair of transistors will conduct.

In accordance with one novel aspect of the present invention, the emitter of the first input transistor is directly cross-coupled to the collector of the fourth current-switching transistor, and the emitter of the second input transistor is directly cross-coupled to the collector of the third current-switching transistor. Because the emitter-collectors are cross-coupled the circuit's upper threshold level changes with the voltage across a first emitter reference impedance which in turn changes in response to the current through the fourth current-switching transistor. In a similar manner, the voltage across a second reference impedance changes in response to the current through the third current-switching transistor thereby controlling the lower threshold level. It should be noted that the switching action of the circuit exhibits hysteresis, that is, the first threshold level is not necessarily equal to the second threshold level. It should be further noted that the threshold level values can be accurately varied and selected by appropriately choosing both the currents through and values of the emitter reference impedances.

In accordance with another aspect of the present invention, a current splitting network is employed to indirectly cross-couple the emitters of the first and second input transistors to the collectors of the fourth and third current-switching transistors. With this current splitting arrangement, current from the conducting current switching transistor, either the third or the fourth, is divided such that part of it goes through one emitter reference impedance and part through the other. The splitting of current alters the voltage drops across the emitter reference impedances and correspondingly alters the threshold switching levels. By adjusting the current splitting network, the threshold levels are adjusted which in turn accurately adjusts the symmetry of the output pulses.

The foregoing and other objects, features, and advantages of the invention will be apparent from the following more particular description of the preferred embodiments of the invention, as illustrated in the accompanying drawings.

In the drawings:

FIG. 1 is a circuit employing direct cross-coupling of the emitters of the first and second transistors to the collectors of the fourth and third transistors, respectively.

Figure 2A:
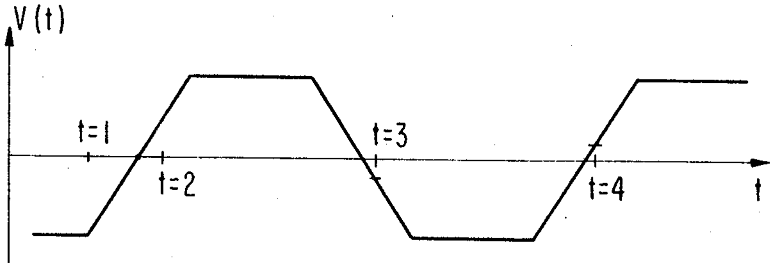
Figure 2B:
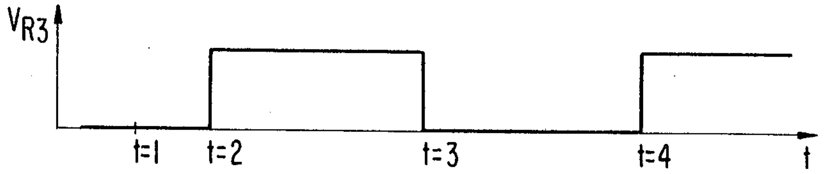
Figure 2C:
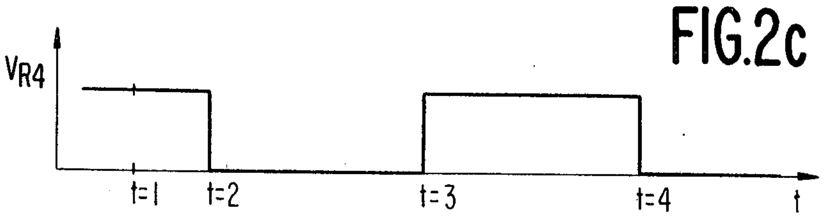

FIGS. 2*a*, 2*b*, and 2*c* depict several characteristic wave shapes associated with the FIG. 1 circuit.

Figure 3:
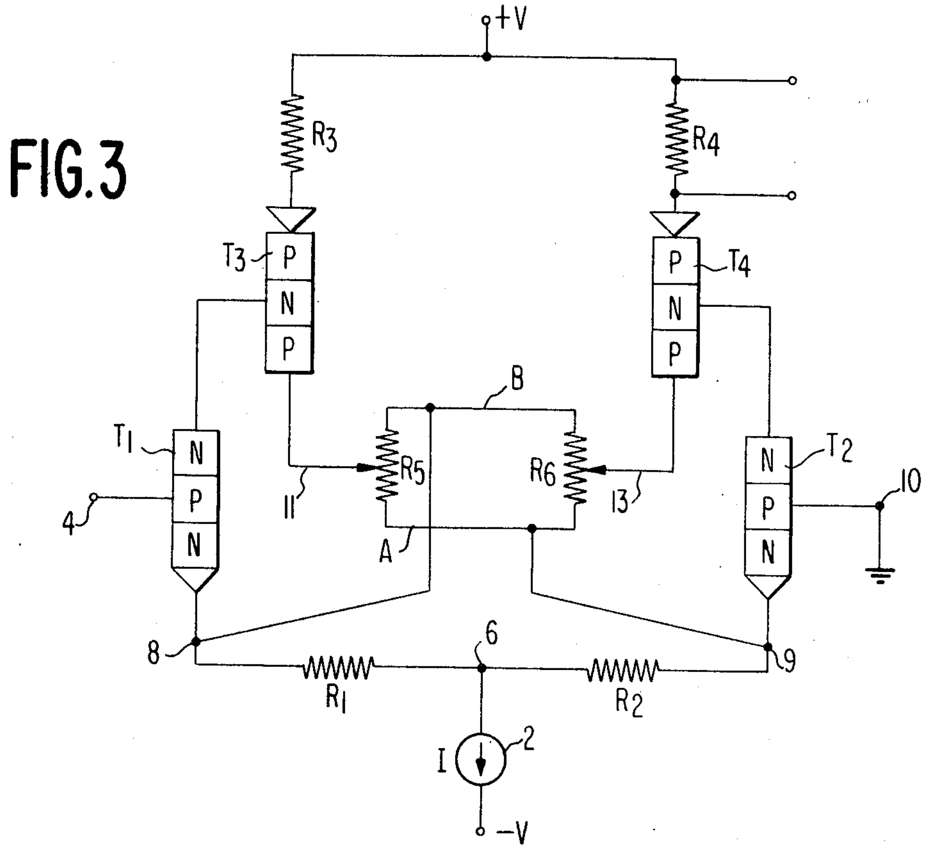

FIG. 3 is a circuit embodying current splitting resistors in the cross-coupling connections between the emitters and collectors.

Figure 4A:
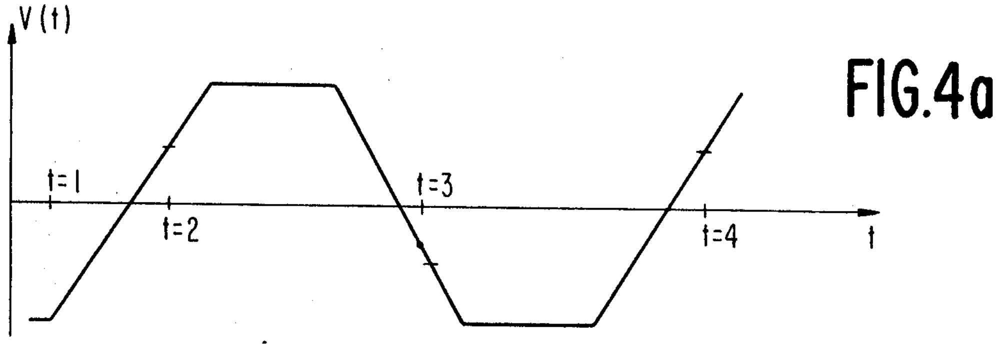
Figure 4B:
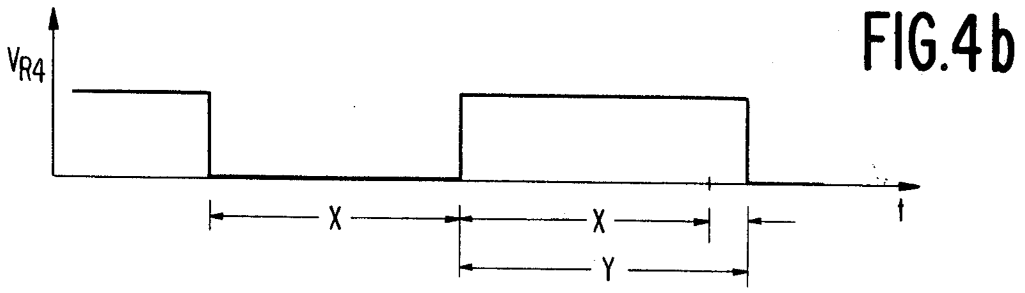

FIGS. 4*a* and 4*b* depict characteristic wave shapes associated with the FIG. 3 circuit.

FIG. 1 DESCRIPTION AND OPERATION

The FIG. 1 circuit detects the excursion of an input voltage, applied to the T1 base at terminal 4, above an upper threshold level and further detects when that input voltage again drops below a lower threshold level. The threshold levels are measured with respect to an input reference level (shown as ground in FIG. 1) which is applied to the T2 base terminal 10. The output from the circuit is derived across resistors R3 and R4. The details of the circuit connections are readily apparent from the FIG. 1 drawing and from the following description of the circuit components and the circuit operation.

The components indicated in the FIG. 1 circuit need be of no special type. In a preferred embodiment, however, the transistors, resistors, and current source should be of high quality in order to obtain high accuracy and stability. In particular, the current-switching transistors T3 and T4 and the input transistors T1 and T2 would have high gain and would also be matched pairs for temperature stability. Although in FIG. 1, T3 and T4 are shown as PNP transistors and T1 and T2 as NPN, the conductivity types can be reversed making T1 and T2 PNP and T3 and T4 NPN merely by reversing the voltage levels. Of course, field-effect transistors, gates, polarity detectors, or other similar devices could be used in place of regular transistors.

The emitter reference impedances need be of no special type, but the quality and accuracy of the circuit is dependent on the quality and accuracy of the resistors R1 and R2. The current source 2 in the simplest form could be a simple high ohm resistor coupled to a voltage source. Of course, more elaborate current sources could be utilized as will be apparent to those skilled in the art.

In operation, the FIG. 1 circuit is stable in either of two states. In the first state, T1 and T3 are *off* so that current source 2 draws current through current-switching transistor T4. In the other state, just the opposite occurs, that is, current source 2 draws current through current-switching transistor T3 since T4 and T2 are *off*. The voltages applied to the bases of T1 and T2 control whether T3 or T4 is conducting. The nature of this control will be described with reference to FIG. 2.

In FIG. 2*a*, a hypothetical input signal $V(t)$ is shown which is applied to the base of T1 at input terminal 4. At an initial time $t=1$, the input voltage $V(t)$ is at a negative level much lower than the reference ground level on the base of T2. Under this condition, T1 is held *off*, and accordingly, T3 is *off* while T4 conducts a current drawn by the current source 2.

The switching *on* and *off* of T1 and T2 can best be explained by considering the series circuit which connects the bases of T1 and T2. More particularly, that circuit commences at the input terminal 4 of T1, connects to the emitter terminal 8 of T1, passes through R1 and R2 to the emitter terminal 9 of T2, and finally goes from the emitter of T2 to its base terminal 10. For the purpose of explaining the variations in the threshold levels, the rest of the FIG. 1 circuit is partially ignored.

The PN base-emitter junctions of T1 and T2 are approximately equivalent to diodes. Therefore when the emitter of T2 is more negative than the ground reference level on the T2 base, T2 is conducting and its diode action tends to clamp the T2 emitter at terminal 9 near ground. Since T1 and T3 are turned *off*, the current through R2 is negligible, and therefore, there is a negligible drop in voltage across R2. As the voltage $V(t)$ rises from a negative value, T1 will not switch *on* until its base-emitter is forward biased, that is, the voltage at terminal 4 is greater than the voltage at terminal 8. Since terminal 9 is clamped near ground and the drop across R2 was negligible, the voltage at terminal 8 is essentially the voltage across R1. Since T2 and T4 are conducting, that voltage at terminal 8 is R1 times the current, $I_1$, through R1 which is essentially equal to the T4 collector current which in turn is approximately the current, I, drawn by source 2. Therefore, the base-emitter of T1 tends to become forward biased at a time $t=2$ when $V(t)$ equals the upper threshold voltage, $VT_U$, which is approximately given by the following equation:

$$VT_U=(I_1)R1\approx IR1 \qquad (1)$$

After $t=2$ with the input $V(t)$ above $VT_U$, T1 is *on* holding T3 *on* thereby allowing the collector current from T3 to pass through R2. This current through R2 causes the voltage at terminal 9 to increase thereby reverse biasing transistor T2 and shutting it, and therefore T4, *off*. Because of the diode clamping action of the T1 base-emitter, the T1 emitter at terminal 8 is clamped at a value not much lower than the value of $V(t)$ applied to the T1 base. Since T4 is *off* the voltage drop across R1 is negligible so that the voltage at terminal 8 tends to follow the input voltage on terminal 4 as long as that input is above the reference level.

It should be noted that the FIG. 1 circuit is highly regenerative. Once conduction through T1 and T3 is initiated, the voltage distribution across R1 and R2 rapidly reverses the relative conduction of T3 and T4 without need for more than a constant input at terminal 4.

In order to turn T1 *off* again, the base-emitter of T1 must be reversed biased. Since the voltage at terminal 8 tends to follow the input voltage at terminal 4, the voltage level at which the voltage at terminal 8 stops following the input voltage at terminal 4 determines when T1 will be reverse biased. That voltage level is determined by noting what happens to the T2 emitter voltage at terminal 9. Because of the diode action of the T2 base-emitter, the terminal 9 voltage can go to any value above ground, but it is clamped so that it cannot go essentially below ground. Therefore, the voltage on terminals 8 and 9 will float up and down with the input voltage $V(t)$ as long as the voltage at terminal 9 is more positive than the reference potential (shown as ground). When the voltage at terminal 9 attempts to go lower than ground, however, T2 starts to conduct and terminal 9 becomes clamped thereby restricting the floating of the voltage on terminal 8 so that the circuit switches to the other stable state. Since the current through and the voltage drop across R1 is negligible, the voltage drop from terminal 9 to terminal 8 is essentially R2 times the current $I_2$ through R2 which is essentially the T3 collector current and which in turn is essentially the current I drawn by source 2. Therefore, the lower threshold voltage, $VT_L$, is to a good approximation the following:

$$VT_L=-(I_2)(R2)\approx -IR2 \qquad (2)$$

The FIG. 1 circuit operates, therefore, such that whenever the input voltage on the T2 base is above $VT_U$, T1 and T3 conduct with T4 and T2 *off*. In a similar manner whenever the input voltage goes below $VT_L$, T1 and T3 are *off* with T2 and T4 *on*.

The input waveform of FIG. 2*a* is symmetrical, that is, the positive going pulse has the same shape and duration as the negative going pulse. By designing the FIG. 1 circuit such that $VT_U$ equals $VT_L$, the FIG. 1 circuit maintains the symmetry of output pulses taken across R3 and R4 since the circuit spends half the time in one conduction state as in the other. Typical output signals derived across the resistors R3 and R4 and which indicate the symmetry are shown in FIGS. 2*b* and 2*c*.

To a very good approximation the magnitudes of the switching levels $VT_U$ and $VT_L$ in the FIG. 1 circuit are determined only by the magnitude of the source current and the magnitudes of resistors R1 and R2. The symmetry of switching points on the other hand is determined by the degree of matching of resistors R1 and R2 and also the degree of matching of the T1 and T2 base emitter characteristics.

FIG. 3.—DESCRIPTION AND OPERATION

The FIG. 3 circuit is essentially the same as the FIG. 1 circuit. FIG. 3 differs in that it employs a current splitting network to cross-couple the T4 collector to the T1 emitter, and to cross-couple the T3 collector to the T2 emitter. A preferred cross-coupling network is shown in FIG. 3 as resistors R5 and R6 connected in parallel. The A end of R5 and R6 is connected to the T2 emitter terminal 9. In a similar manner, the B end of R5 and R6 is connected to the T1 emitter terminal 8. The T3 collector is connected as a wiper arm 11 which sweeps from A to B on R5 and is used to vary the flow of T3 collector current through the emitter reference impedances R1 and R2. In a similar manner, the T4 collector is connected as a wiper arm 13 which sweeps from A to B on R6 in order to split the T4 collector current. Although the current splitting network in one preferred embodiment has been shown as two parallel resistors having variable taps, those skilled in the art will recognize many variations which are suitable for splitting the current between the emitter reference impedances.

The operation of the FIG. 3 circuit is essentially the same as the operation of the FIG. 1 circuit. The principal difference is that in FIG. 3, the T3 collector current does not necessarily all go through R2, and similarly, the T4 collector current does not necessarily all go through R1. By way of comparison, when T3 was *on* in the FIG. 1 circuit, the T3 collector current (approximately $I_2$) which passed through R2 was essentially equal to the current I drawn by source 2. In a similar manner in FIG. 1, the T4 collector current ($I_1$) passing through R1 was also approximately equal to the current I drawn by source 2. In the FIG. 3 circuit, the sum of currents $I_1$ and $I_2$ through the emitter reference resistors R1 and R2, respectively, must equal the current I drawn by the source 2. Of course, the relative values of $I_1$ and $I_2$ can be altered by varying the settings of R5 and R6.

FIG. *4a* shows a hypothetical input signal $V(t)$ which is applied in the FIG. 3 circuit to the T1 base terminal 4. At a time $t=1$, the input voltage $V(t)$ is at a value much more negative than the reference voltage level on the T2 base terminal 10. Under this condition, T1 and T3 are turned *off* and T4 and T2 are conducting. The T4 collector current essentially equals the current I drawn by the current source 2. The splitting of the T4 collector current is controlled by the setting of the wiper arm 13 on R6.

With the wiper arm 13 placed at the B end of R6, essentially all of the T4 collector current goes through R1 and the operation with this setting of the wiper arm is essentially the same as in the FIG. 1 circuit. However, with the wiper arm 13 set on the A end of R6, all of the T4 collector current goes through R2. By setting the wiper arm 13 at any value between A and B the relative amounts of current through R1 and R2 can be controlled. In a similar manner, the wiper arm 11 on R5 controls the division of the T3 collector current.

The effect of setting the wiper arms at values between A and B is to alter the voltage drops across the reference resistors R1 and R2. While in the FIG. 1 circuit the drop across R1 could be ignored while T3 was conducting and similarly the drop across R2 while T4 was conducting, these drops cannot be ignored in FIG. 3 if there is a splitting of the current I between R1 and R2.

Since, as indicated in discussing the FIG. 1 circuit operation, the voltage between the emitter terminals 8 and 9 to a good approximation determines the upper and lower threshold levels, Eqs. 1 and 2 given for the FIG. 1 circuit can be expanded for the FIG. 3 circuit to account for the current splitting as follows:

$$VT_U=(I_1)(R1)-(I-I_1)(R2) \quad (3)$$

$$VT_L=(I_2)(R2)-(I-I_2)(R1) \quad (4)$$

where:

$VT_U$=upper threshold level
$VT_L$=lower threshold level
$I_1$=current through R1
$I_2$=current through R2
$I=I_1+I_2$=current drawn by current source.

FIG. *4b* depicts an output voltage across R4 where the FIG. 3 circuit has an input like the FIG. *4a* signal and where $VT_U$ is made unequal to $VT_L$. More particularly, FIG. *4b* shows the case where $VT_L$ is equal to one-half of $VT_U$. Note that although the input pulse of FIG. *4a* was symmetrical, the FIG. *4b* output is non-symmetrical, that is, the duration X of a first pulse is shorter than the duration Y of the next pulse.

By varying the current splitting network the voltage threshold levels can be varied according to Eqs. 3 and 4 which in turn varies the X and Y duration values. Therefore, the symmetry of the output pulses is readily adjusted which in actual practice proves to be a very precise adjustment.

It should be noted that the inclusion of current splitting potentiometers R5 and R6 provides largely independent adjustment of the current feedback from a high positive value (the circuit of FIG. 1) to a high negative value (such as in differential amplifiers). In the present invention, there is added the ability to continuously and independently adjust both of the switching threshold levels until they become equal to the reference potential. At the point where the thresholds coincide ($VT_U=VT_L$), a nearly ideal polarity detector is formed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A threshold detector circuit comprising:
first and second input transistors having first and second bases, collectors, and emitters, respectively,
emitter impedances connected to the first and second emitters, respectively,
third and fourth transistors having third and fourth collectors, bases and emitters, respectively, and means connecting said third base to said first collector and means connecting said fourth base to said second collector,
a current source connected to drive current through said emitter impedances and through said third and fourth transistors whereby said current is conducted by either the third or the fourth transistor depending upon the bias on said first and second bases, and
connecting means cross-coupling the fourth collector to the first emitter and connecting means cross-coupling the third collector to the second emitter, wherein said connecting means includes continuously variable current splitting means for dividing current drawn by said current source between said emitter impedances, such that the currents to the first and second emitter impedances control the threshold voltage levels.

2. A threshold detector circuit comprising first and second input transistors having first and second bases, collectors, and emmitters, respectively,
emitter impedances connected to the first and second emitters, respectively,
third and fourth transistors having third and fourth collectors, bases and emitters, respectively, and means connecting said third base to said first collector and means connecting said fourth base to said second collector,
a current source connected to drive current through said emitter impedances and through said third and fourth transistors whereby said current is conducted by either the third or the fourth transistor depending upon the bias on said first and second bases, and connecting means cross-coupling the fourth collector to the first emitter and connecting means cross-coupling the third collector to the second emitter, wherein said connecting means includes current splitting means for dividing current drawn by said current source between said emitter impedances, said current splitting means comprising parallel resistances having variable taps, such that the currents through the first and second emitter impedances control the threshold voltage levels.

References Cited

UNITED STATES PATENTS

| | | | |
|---|---|---|---|
| 3,070,709 | 12/1962 | Slobodzinski | 307—292 X |
| 3,292,014 | 12/1966 | Brooksby | 307—291 X |
| 3,289,079 | 11/1966 | Ferguson | 307—235 |

JOHN S. HEYMAN, Primary Examiner

R. L. WOODBRIDGE, Assistant Examiner

U.S. Cl. X.R.

307—255, 288, 291